Dec. 30, 1941.      J. R. SHEESLEY      2,268,267
CAR BODY SUSPENSION AND TRUCK CONSTRUCTION
Filed April 11, 1940      4 Sheets-Sheet 1

INVENTOR.
Jay R. Sheesley,
BY
attys.

Dec. 30, 1941.   J. R. SHEESLEY   2,268,267
CAR BODY SUSPENSION AND TRUCK CONSTRUCTION
Filed April 11, 1940   4 Sheets-Sheet 2
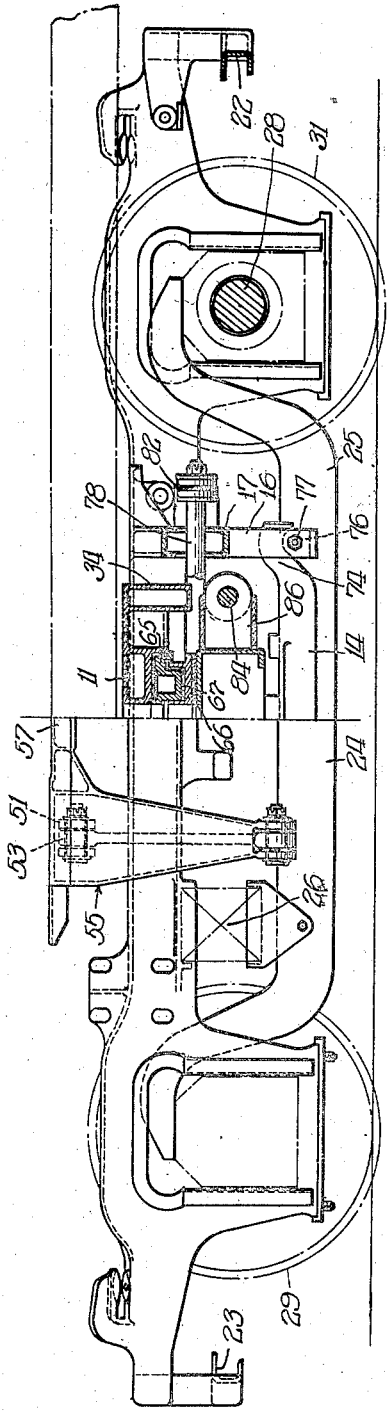
INVENTOR.
Jay R. Sheesley
BY
attys.

Dec. 30, 1941.   J. R. SHEESLEY   2,268,267
CAR BODY SUSPENSION AND TRUCK CONSTRUCTION
Filed April 11, 1940   4 Sheets-Sheet 3

INVENTOR:
Jay R. Sheesley,
BY
attys.

Dec. 30, 1941.　　J. R. SHEESLEY　　2,268,267
CAR BODY SUSPENSION AND TRUCK CONSTRUCTION
Filed April 11, 1940　　4 Sheets-Sheet 4
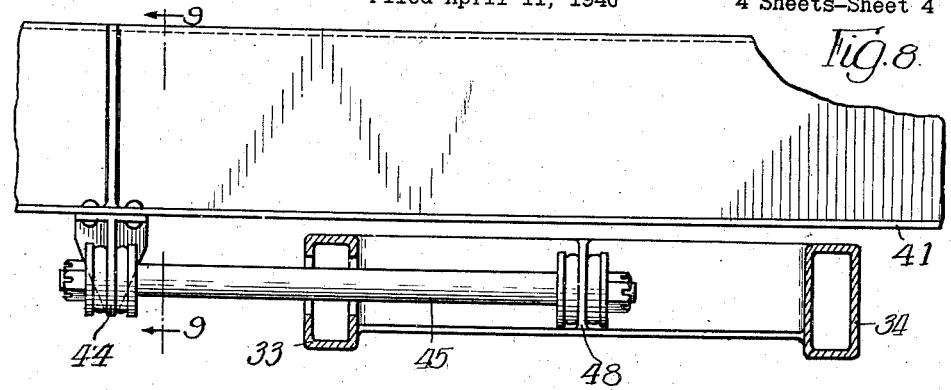
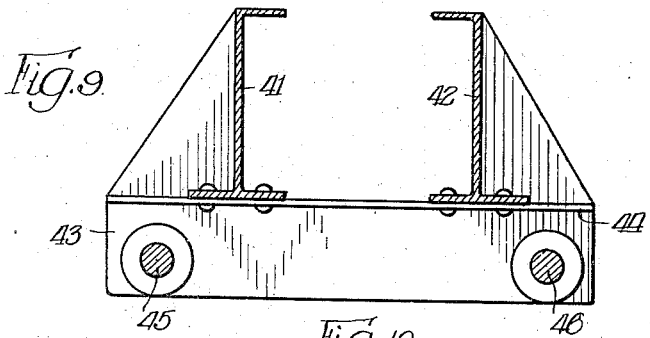
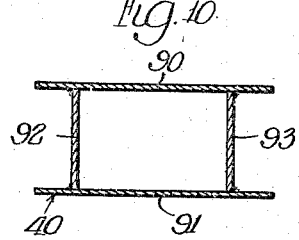
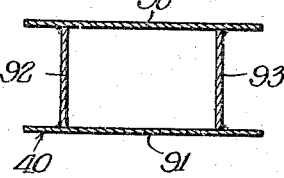
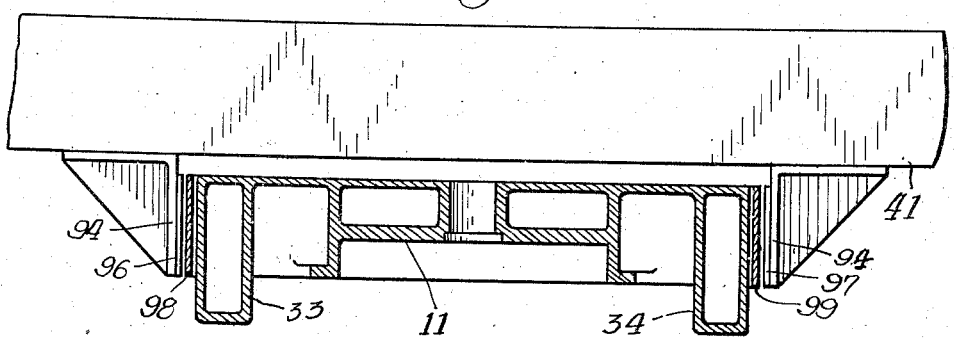
INVENTOR.
Jay R. Sheesley,
BY
ATTYS.

Patented Dec. 30, 1941

2,268,267

UNITED STATES PATENT OFFICE 2,268,267

CAR BODY SUSPENSION AND TRUCK CONSTRUCTION

Jay R. Sheesley, Chicago, Ill.

Application April 11, 1940, Serial No. 329,075

12 Claims. (Cl. 105—171)

The present invention relates to improvements in car body suspension and in the trucks which are used to carry the car bodies. The present invention is applicable to passenger cars, freight cars, street cars and interurban coaches, or in other words, generally to all types of cars used for transportation on rails.

Heretofore it has been proposed by various methods to carry the load of the car body by means of hangers or the like which permit lateral movement of the car body with respect to the rail. In present equipment, swing motion hangers are in certain instances built into the truck construction so that a certain part of the truck may have a lateral swinging motion with respect to the car wheels and the rail. One fundamental purpose of the present invention is to provide a novel arrangement whereby the car body proper may be suspended from the truck assembly. Certain advantages which necessarily follow are obtained by this arrangement. It is possible to utilize relatively long suspension hangers whose upper fulcrum points are closer to the center of gravity of the car body than is now possible with conventional truck supported hangers. The increased length of the hanger itself insures less impact reaching the car body for a given amount of lateral travel. It is possible to give to the hangers a slight angularity to the vertical sufficient to cause the car body to center itself and yet allow adequate lateral travel without tilting the supported load.

The present invention contemplates a structure wherein the car body has adequate lateral travel to take care of shocks that may be imparted to the truck by lateral movement of the car wheel. This lateral travel is provided without sacrificing any feature of safety that is now available where the car body is directly attached without lateral travel. The truck and body are so connected by means of the hangers and the associated structure that in the event of hanger breakage the car body is immediately lowered a slight distance onto the body suspension bolster where it is carried in the same manner as it is carried in a conventional truck body assembly, that is, in direct engagement with the bolster.

In the present device, I utilize a construction which eliminates the necessity of a spring plank. Swing hangers are not placed over the rail between the car wheels. There is nothing underneath the truck in the way of swing hanger construction that, in the event of breakage, would tend to cause derailment. It is not necessary to provide any safety straps such as are now used in connection with spring planks.

The body suspension bolster is directly carried by the center plate construction coupled together with the usual king-pin, and the truck bolster itself floats vertically on its springs, but is prevented from moving horizontally either in a lateral or longitudinal direction with respect to the truck frame.

It is a particular purpose of the present invention to simplify the truck frame construction and the suspension of the car body thereon, particularly with respect to maintenance and repair. The suspension of the car body is such that all of the load bearing pins and bushings are readily accessible and it is not necessary in the event of hanger breakage to place the car over a pit in order to make repairs and adjustments. The truck bolster is supported by spring beams located at the side of the truck frame where they may be readily accessible for replacement of springs.

The relation of the car body and its center of gravity to the center line between the springs at opposite sides of the truck frame is one which varies within relatively narrow limits as lateral movement occurs between the truck frame and the car body.

If the center of gravity shifts to one side of vertical over the center line between springs, this tends to compress the springs more on that side than the other. The slight angular position of the hangers with respect to vertical provides a compensating tendency to lift the car body on that side because the outside hanger grows shorter vertically and the inside hanger longer vertically until the inside hanger reaches vertical position. By calculating the relation of these movements, it is possible to adequately correct the car body level for the difference in the resulting height of the springs due to the unequal compression.

Where the body is supported directly from a body suspension bolster, which bolster is pivoted on the center plate, it is of course essential to provide means for taking the draft and braking thrusts from the body to the truck frame. These thrusts must be taken in such manner as to protect the swing hangers from the undue strains that would be otherwise communicated to them. The present invention contemplates the provision of a novel combination of the body suspension bolster with end thrust rods for this purpose. The body is coupled to the body suspension bolster by a plurality of end thrust rods placed on opposite sides of the center plate bearing. Other suitable means may be provided to transmit the draft and braking forces from the car body to the body suspension bolster. Such conventional means as wear or chafing plates applied to brackets opposing one another may be used for this purpose.

The truck bolster which receives the thrust through the center plate bearing is also coupled to the truck frame by end thrust rods so as to transmit the end thrust direct to the truck frame itself. End thrust rods are also used to couple the truck bolster to the truck frame so as to eliminate lateral play of the truck bolster with respect to the truck frame. The end and lateral thrusts from the truck bolster to the truck frame may be taken by chafing plates, resilient pads or other known constructions.

This application is a continuation in part of my application Serial No. 302,031, filed October 30, 1939, which application has been abandoned.

The features and advantages of the present invention will appear more fully as the description proceeds, reference being had to the accompanying drawings wherein a preferred form of the invention is shown. It is to be understood, however, that the drawings and description are illustrative only and are not to be taken as limiting the invention except insofar as it is limited by the claims.

In the drawings, Fig. 1 is a plan view of a truck frame embodying the present invention, one-half of the body suspension bolster being shown with the brackets which connect it to the car body, while the other half is left off for the purpose of illustrating more clearly the truck construction;

Fig. 2 is a sectional view taken generally on the line 2—2 of Fig. 1;

Fig. 3 is a sectional view taken on the line 3—3 of Fig. 1;

Fig. 8 is a fragmentary sectional view taken on the line 8—8 of Fig. 1;

Fig. 9 is a sectional view taken on the line 9—9 of Fig. 8;

Fig. 10 is a sectional view through the body bolster taken on line 10—10 of Fig. 3, and Fig. 11 is a sectional view taken on the line 11—11 of Fig. 5.

Figure 1:
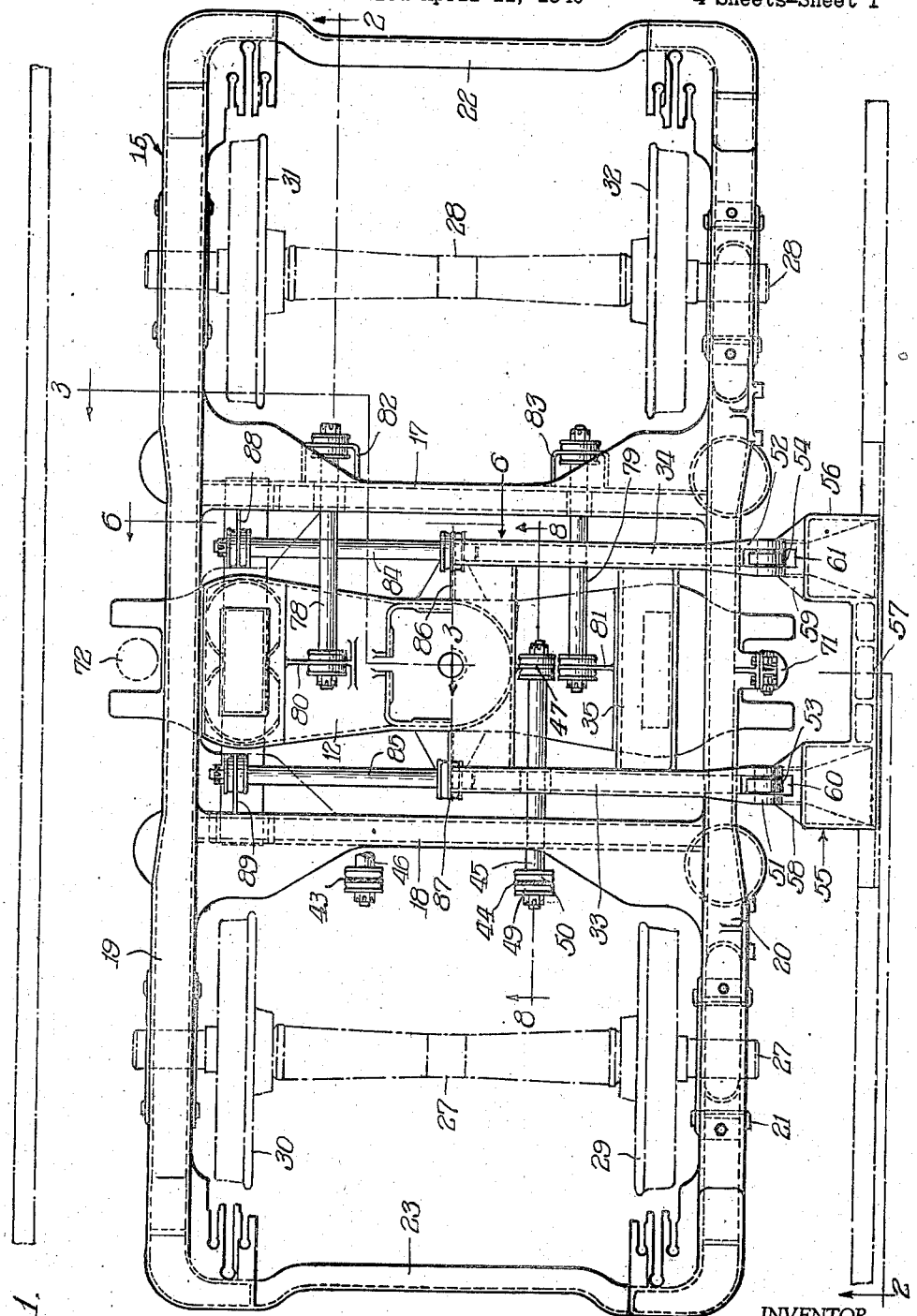

Referring now in detail to the drawings, the present invention is embodied in a truck for railway cars having means for suspending the body of the car from a body suspension bolster 10 that is, in turn, pivoted by a center plate bearing 11 upon a truck bolster 12. The truck bolster 12 is supported adjacent its opposite ends by two spring beams 13 and 14. The spring beams 13 and 14 are hung from a truck frame 15 by means of brackets 16, the brackets 16 being formed on the truck transom or cross members 17 and 18. The truck frame 15, as shown best by Fig. 1, comprises longitudinal side frames 19 and 20 which are provided with suitable journal box pedestals indicated generally by the numeral 21. The side frames 19 and 20 are connected together by the cross frame members 17 and 18 and by end transoms 22 and 23. As illustrated best in Figs. 1 and 2, the ends of the frames 19 and 20 and the end transoms 22 and 23 are provided with the usual brake hanger and brake lever mounting means. These means, however, form no part of the present invention and will not be described in detail. The truck frame 15 is supported by equalizers 24 and 25 by means of conventional springs which are illustrated at 26 in Fig. 2. The equalizers are of course carried in the usual manner by the axles 27 and 28. The device shown is a four-wheel truck having wheels 29 and 30 on the axle 27 and wheels 31 and 32 on the axle 28.

The body suspension bolster 10 comprises two spaced beams 33 and 34 which beams are connected at the center by the center plate bearing 11 and adjacent their ends by a Z-shaped cross tie 35 near each end. The cross ties 35 are each provided with a wear plate 36 for cooperation with a conventional side bearing 37 that, in turn, is supported on a raised portion 38 of the truck bolster 12. The beams 33 and 34 slope upwardly and outwardly from the center plate bearing 11 and provide a cradle for a body bolster 40 (Figs. 8 and 10), the body bolster 40 being rigidly attached to the car body and to the center sills 41 and 42 of the car body.

The car body is provided with suitable brackets 43 and 44 which are secured to the sills 41 and 42 (see Figs. 8 and 9), and these brackets serve to anchor the body ends of two end thrust rods 45 and 46. The end thrust rods 45 and 46 extend through the beam 33, laterally elongated slots being provided in the beam 33 to allow for the lateral sway of the body. The other ends of the rods 45 and 46 are connected to brackets 47 and 48 provided at the opposite sides of the center plate bearing member 11. The end thrust rods are provided, as shown, with rubber cushions 49 and 50 in order to cushion the endwise thrusts due to draft and brake forces as they are transferred from the body to the body suspension bolster through these rods.

At their outer ends, the beams 33 and 34 are bifurcated, as shown at 51 and 52 in Fig. 1 to receive swing hangers 53 and 54. It will be understood that there are two hangers 53 on the beam 33, that is, one at each end, and there are two hangers 54 on the beam 34. In order to support the car body on the hangers 53 and 54, the car body is provided at its opposite sides with two sets 55 and 56 of supporting brackets, these brackets being directly under the vertical side wall of the car. Each of the brackets 55 and 56 comprises a mounting portion 57 which is rigidly attached to the bolster 40 and two depending arms 58 and 59 which extend downwardly and inwardly. The arms are bifurcated, as indicated at 60 and 61 (see Fig. 1) to receive the lower ends of the hangers 53 and 54. Suitable bearing pins are of course provided for connecting the hangers to the beams 33 and 34 and to the arms 58 and 59. The bearings are accessible at all times because of their exposed position at the sides of the car body and truck and may be provided with any well-known lubricating devices.

As illustrated best in Fig. 3, the hangers 53 and 54 are directed outwardly at a slight angle to the vertical from the top downwardly. This angle, in a normal construction, need not exceed 6°. One purpose of the slight angle to the vertical is to cause a limited resistance to lateral movement of the body with respect to the suspension bolster 10 at all times. This insures that the body will seek the same position of rest and will not tend to oscillate as would be the case if the hangers 53 and 54 at the opposite sides of the body were exactly parallel to each other. The over-all length of the hangers 53 and 54 is limited only by the height to which the body suspension bolster may be brought with respect to the car body itself. By forming the body bolster 40 so as to permit of the necessary clearance, the hangers may be made considerably longer than they are shown in Fig. 3 of the drawings.

Figure 4:
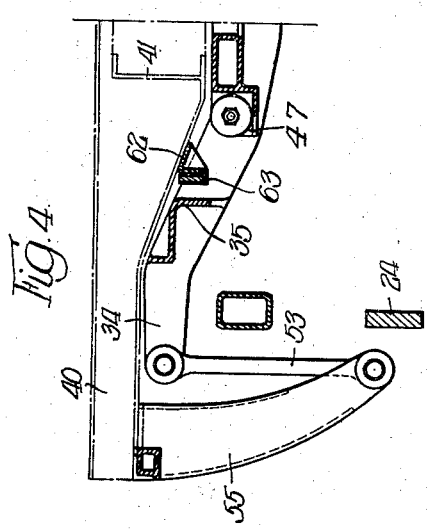
Fig. 4 is a fragmentary sectional view taken through the body suspension bolster and center plate construction illustrating the means for limiting lateral and endwise movement of the car body with respect to the body suspension bolster.
Figure 7:
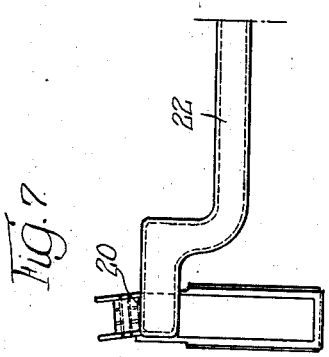
Fig. 7 is a fragmentary end elevation illustrating the end transom of the truck frame.

It will be evident from an inspection of the drawings that any normal lateral thrust which may be imparted to the truck frame 15 would be prevented from communication to the body of the car by swinging movement of the hangers 53 and 54. Owing to the length of the hangers, it would require considerable lateral shift of the bolster 10 with respect to the car body before any appreciable tilting of the car body would result. The allowable lateral shift may be limited, for example, by providing on the body bolster 40 a bracket 62 which, in turn, is provided with a cushion 63 that is adapted to engage the Z-bar 35 of the body suspension bolster 10. In Fig. 4, the hangers 53 and 54 have been shown parallel at the opposite sides of the car body, and if desired, this may of course be done, in which case the normal friction in the bearings or suitable cushioning means such as the pad 63 may be used to prevent oscillation of the car body.

In the usual construction of modern passenger cars, the center of gravity of the car body is somewhere about seventy inches from the rail. The long swing hangers 53 and 54 place the point of suspension of the car body fairly close to the center of gravity and thus make the point of support of the swinging load much higher with respect to the center of gravity than is the case with swing hangers which are employed in the truck construction itself. The swing hangers here are placed outside the main truck frame so as to be readily accessible.

It will be appreciated that as the body shifts laterally with respect to the truck there is a greater load on the springs at the side of the truck toward which the lateral shift takes place. This tends to compress the springs 26 on that side more than the opposite springs. The unequal compression which would tend to cause the car body to lean in that direction is compensated by the action of the swing hangers 53 and 54. The hanger on the side toward which the body shifts increases its angle to the vertical while the other hanger becomes more nearly vertical. Thus the body is moved slightly higher with respect to the body suspension bolster.

The center plate bearing 11 is recessed on its lower surface, and has a resilient pad 64 to receive a bearing plate 65. The bearing plate 65 seats in another bearing plate 66 that is carried by the truck bolster 12. A manganese bearing liner 67 is used between the plates. The plate 66 may be supported upon a resilient pad 68. A flange 69 is provided on the bolster 12 to hold the plate 66 in position. A central opening 70 is provided in the members 11, 65, and 66 to receive a conventional king-pin (not shown) by which the center plate bearing construction is held together.

It will be observed that the clearance between the body suspension bolster 10 and the body bolster 40 is very slight. It is exaggerated in the drawings since the necessary clearance need only be in the neighborhood of an inch or less to take care of all tilting of the body that would occur by reason of lateral shifting of the body relative to the truck. The body bolster 40 is directly over the suspension bolster 10 and is shaped to follow the outline of the suspension bolster. Therefore, if an accident should occur wherein the swing hangers 53 and 54 at either side of the car body should give way, the only result would be that the car body would then rest directly upon the suspension bolster and until repaired the construction would not permit of any lateral play between the car body and the bolster 10. This device, therefore, has the same safety as the conventional means of supporting the car body where the body bolster itself is provided with the center plate bearing and no lateral travel is provided for the car body. Furthermore, it is only a matter of jacking up the car body at one side to replace the broken swing hangers, if they should break, and this can be done without much trouble.

To relieve the center plate bearing and the structure supported thereby from vertical shocks, the truck bolster 12 is spring supported from the truck frame 15 so that it has vertical movement. Any suitable shock absorbing mechanism may also be used at the ends of the truck bolster 12 as, for example, at 71 and 72 in Fig. 1. The truck bolster must, however, be secured to the truck frame 15 in such fashion as to prevent lateral or endwise movement thereof.

The means for supporting the truck bolster 12 on the truck frame 15 for vertical movement comprises the two spring beams 13 and 14. These spring beams carry suitable coil springs such as are indicated at 73, and these coil springs support the bolster 12. The spring beams 13 and 14 have their opposite ends curved upwardly as indicated at 74 (see Fig. 2) to provide hooks for engaging in the brackets 16. Each of the brackets 16 has gibs 75 at the lower edge thereof and a cast block 76 is seated in the bracket so as to rest upon the gibs 75. A bolt 77 holds the block 76 in place. There is no tendency for the spring beam to crawl endwise because it carries no end stress. The truck bolster is prevented from moving laterally or endwise with respect to the truck frame by means which will be presently described. Therefore, there is no tendency for the blocks 76 to work out of the brackets, even if the bolt 77 should fall out.

Whenever it becomes necessary to replace the coiled springs 73, this may be accomplished by jacking up the spring beam enough to remove the cast block 76. Then the beam may be dropped through the end of the bracket and the spring replaced, after which the beam can again be raised and the block 76 be put back in place.

The truck bolster 12 is anchored to the cross beam 17 at both sides of the center plate bearing by two end thrust rods 78 and 79. Upstanding flanges 80 and 81 are formed on the truck bolster for securing one end of the thrust rods 78 and 79. The other end of the thrust rods are secured to two brackets 82 and 83 which are welded or otherwise secured to the vertical side wall of the cross frame 17. Vertically elongated openings are provided in the frame 17 to enable the rods 78 and 79 to accommodate themselves to the vertical movement of the truck bolster 12 with respect to the truck frame. The truck bolster 12 is held against lateral movement with respect to the truck frame 15 by two end thrust rods 84 and 85. The bolster is provided with two flanged webs 86 and 87 extending forwardly and rearwardly at the center plate bearing. The rods 84 and 85 are connected to the webs 86 and 87, suitable rubber cushions being provided at the connections. The truck transom cross frames 17 and 18 have brackets 88 and 89 thereon for securing the other ends of the rods 84 and 85.

The body bolster 40 is shown in cross section in Fig. 10. It comprises a top cover plate 90, a bottom cover plate 91, and spaced web plates 92 and 93. The plates may be welded together. At the center, the plates are cut out to fit the center sills 41 and 42 and the web plates are secured, for example by welding, direct to the center sills.

Figure 5:
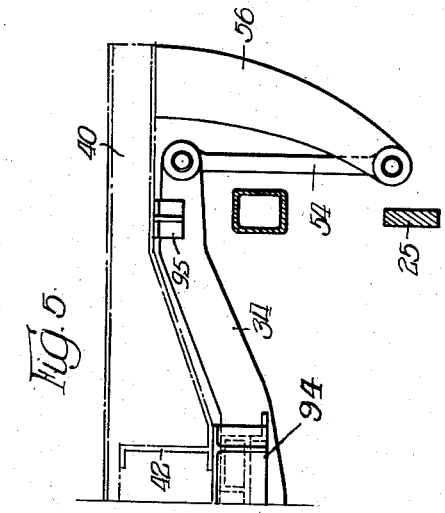
Fig. 5 is a fragmentary sectional view showing a modified construction wherein the endwise thrusts between the body and the body suspension bolster are taken by wear or chafing plates.
Figure 6:
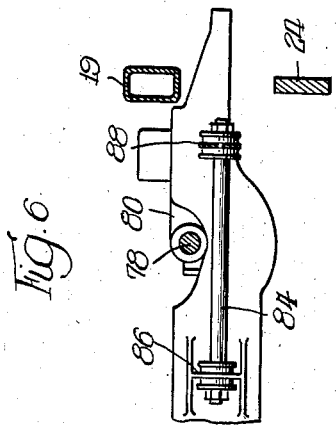
Fig. 6 is a fragmentary sectional view taken substantially on the line 6—6 of Fig. 1 to show the connection of the lateral thrust rod between the truck bolster and the truck frame.

Referring now to Figs. 5 and 11, there is shown a modified construction wherein end thrust is taken by a plurality of pairs of brackets 94 and 95 on the body. These brackets 94 and 95 are provided with wear plates 96 and 97 and corresponding wear plates 98 and 99 on the body suspension bolster. Fig. 5 shows the brackets 94 and 95, one at the center and the other near the side edge of the car body. The wear plates are similarly located on the body suspension bolster. The preferred means for transmitting the draft and braking forces between the body and the body suspension bolster, however, are those shown in Figs. 1, 8 and 9.

The present construction, while particularly applicable to passenger cars of high speed trains, is not limited thereto. For example, except for making provisions for necessary clearances, no change would be required in certain present freight car body or truck constructions to apply my new body suspension bolster and obtain its advantages. The application of my improved features to car body and truck design improves the riding qualities of the car. The safety is also improved by the fact that lateral shocks are taken care of in such a fashion as to minimize the danger of breakdown due to excessive strains on the parts by reason of such shocks. The arrangement of the body suspension hangers and the spring beams at the sides of the truck frame minimizes the danger of derailment by avoiding placing wear parts across the rails. Parts that wear are most apt to break and fall down. If they are over or across the rails, there is immediate danger of derailment if any of them break.

From the above description it is believed that the features and advantages of my invention will be readily apparent to those skilled in this art. Having thus described my invention, what I claim as new and desire to secure by Letters Patent is:

1. In combination, a car body, a car truck, and means for mounting the body on the truck comprising a truck bolster, spring means mounting the truck bolster on the truck for vertical movement, means limiting endwise and lateral movement of the truck bolster on the truck, a body suspension bolster extending transversely of the car body and having its ends in close proximity to the car body, center plate bearings on both bolsters for pivotally mounting the suspension bolster on the truck bolster, thrust means interposed between the body suspension bolster and the car body to transfer the draft and brake thrusts between the car body and the body suspension bolster, and means suspending the body for lateral swinging movement on said suspension bolster and adapted to prevent appreciable tipping of the car body with respect to the suspension bolster over its range of lateral swinging movement, said last named means comprising hangers pivoted at the ends of said suspension bolster and extending substantially vertically down outside the truck and below the ends of the truck bolster, and brackets on the car body beneath the side walls thereof, said brackets being extended downwardly and inwardly to the lower ends of said hangers and being pivotally mounted on said hangers.

2. In combination, a car body, a car truck, and means for mounting the body on the truck comprising a truck bolster, spring means mounting the truck bolster on the truck for vertical movement, means limiting endwise and lateral movement of the truck bolster on the truck, a body suspension bolster extending transversely of the car body and having its ends in close proximity to the car body, center plate bearings on both bolsters for pivotally mounting the suspension bolster on the truck bolster, thrust means interposed between the body suspension bolster and the car body to transfer the draft and brake thrusts between the car body and the body suspension bolster, and means suspending the body for lateral swinging movement on said suspension bolster and adapted to prevent appreciable tipping of the car body with respect to the suspension bolster over its range of lateral swinging movement, said last named means comprising hangers pivoted at the ends of said suspension bolster and extending substantially vertically down outside the truck and below the ends of the truck bolster, and brackets on the car body beneath the side walls thereof, said brackets being extended downwardly and inwardly to the lower ends of said hangers and being pivotally mounted on said hangers, said body having a body bolster over the suspension bolster and in closely spaced relation thereto whereby to settle on the suspension bolster and provide direct support of the car body on the suspension bolster in the event of failure of the hangers.

3. In combination, a card body, a car truck, and means for mounting the body on the truck comprising a truck bolster, spring means mounting the truck bolster on the truck for vertical movement, means limiting endwise and lateral movement of the truck bolster on the truck, a body suspension bolster extending transversely of the car body and having its ends in close proximity to the car body, center plate bearings on both bolsters for pivotally mounting the suspension bolster on the truck bolster, thrust means interposed between the body suspension bolster and the car body to transfer the draft and brake thrusts between the car body and the body suspension bolster, and means suspending the body for lateral swinging movement on said suspension bolster and adapted to prevent appreciable tipping of the car body with respect to the suspension bolster over its range of lateral swinging movement, said last named means comprising hangers pivoted at the ends of said suspension bolster and extending substantially vertically down outside the truck and below the ends of the truck bolster, and brackets on the car body beneath the side walls thereof, said brackets being extended downwardly and inwardly to the lower ends of said hangers and being pivotally mounted on said hangers, said brake and draft thrust transfer means comprising spaced end thrust rods each having one end mounted on said body suspension bolster and extending lengthwise of the car body, the other ends of said rods being mounted on the car body.

4. In combination, a car body, a car truck, and means for mounting the body on the truck comprising a truck bolster, spring means mounting the truck bolster on the truck for vertical movement, means limiting endwise and lateral movement of the truck bolster on the truck, a body suspension bolster extending transversely of the car body and having its ends in close proximity to the car body, center plate bearings on both bolsters for pivotally mounting the suspension bolster on the truck bolster, thrust means interposed between the body suspension bolster and the car body to transfer the draft and brake thrusts between the car body and the body suspension bolster, and means suspending the body for lateral swinging movement on said suspension bolster and adapted to prevent appreciable tipping of the car body with respect to the suspension bolster over its range of lateral swinging movement, said last named means comprising hangers pivoted at the ends of said suspension bolster and extending substantially vertically down outside the truck and below the ends of the truck bolster, and brackets on the car body beneath the side walls thereof, said brackets being extended downwardly and inwardly to the lower ends of said hangers and being pivotally mounted on said hangers, said brake and draft thrust transfer means comprising spaced end thrust rods each having one end mounted on said body suspension bolster and extending lengthwise of the car body, the other ends of said rods being mounted on the car body, said rods having resilient cushioning means at their end mountings.

5. In combination, a car body, a car truck, and means for mounting the body on the truck comprising a truck bolster, spring means mounting the truck bolster on the truck for vertical movement, means limiting endwise and lateral movement of the truck bolster on the truck, a body suspension bolster extending transversely of the car body and having its ends in close proximity to the car body, center plate bearings on both bolsters for pivotally mounting the suspension bolster on the truck bolster, thrust means interposed between the body suspension bolster and the car body to transfer the draft and brake thrusts between the car body and the body suspension bolster, and means suspending the body for lateral swinging movement on said suspension bolster and adapted to prevent appreciable tipping of the car body with respect to the suspension bolster over its range of lateral swinging movement, said last named means comprising hangers pivoted at the ends of said suspension bolster and extending substantially vertically down outside the truck and below the ends of the truck bolster, and brackets on the car body beneath the side walls thereof, said brackets being extended downwardly and inwardly to the lower ends of said hangers and being pivotally mounted on said hangers, said body having a body bolster over the suspension bolster and in closely spaced relation thereto whereby to settle on the suspension bolster and provide direct support of the car body on the suspension bolster in the event of failure of the hangers, and cooperating means on the body bolster and body suspension bolster to limit lateral swinging movement of the car body.

6. In combination, a car body, a truck frame, said frame having means thereon for suspending the car body, said means comprising spring beams extending longitudinally of the truck frame at the opposite sides of the truck frame and carried by it, a truck bolster, springs carried by said beams and supporting the bolster, means coupling the truck bolster to the truck frame to prevent relative lateral and endwise movement therebetween, a body suspension bolster pivoted on said truck bolster, said suspension bolster extending transversely of the car body and having its ends in close proximity to the car body, swing hangers suspended substantially vertically from the ends of the body suspension bolster for lateral swinging movement transversely of the car body without appreciable tipping of the car body about its longitudinal axis relative to said bolster, and brackets extending downward beneath the sides of the car body outside the truck frame, said brackets being pivoted to the lower ends of the swing hangers, said hangers extending below the truck bolster, said body having means extending transversely thereof directly over the body suspension bolster and in close proximity thereto to take the load of the car directly to the suspension bolster upon failure of the hangers.

7. In combination, a car body, a truck frame, said frame having means thereon for suspending the car body, said means comprising spring beams extending longitudinally of the truck frame at the opposite sides of the truck frame and carried by it, a truck bolster, springs carried by said beams and supporting the bolster, means coupling the truck bolster to the truck frame to prevent relative lateral and endwise movement therebetween, a body suspension bolster pivoted on said truck bolster, said suspension bolster extending transversely of the car body and having its ends in close proximity to the car body, swing hangers suspended substantially vertically from the ends of the body suspension bolster for lateral swinging movement transversely of the car body without appreciable tipping of the car body about its longitudinal axis relative to said bolster, and brackets extending downward beneath the sides of the car body outside the truck frame, said brackets being pivoted to the lower ends of the swing hangers, said hangers extending below the truck bolster, said truck frame having depending brackets and said spring beams being mounted on said brackets.

8. In combination, a car body, a truck frame, said frame having means thereon for suspending the car body, said means comprising spring beams extending longitudinally of the truck frame at the opposite sides of the truck frame and carried by it, a truck bolster, springs carried by said beams and supporting the bolster, means coupling the truck bolster to the truck frame to prevent relative lateral and endwise movement therebetween, a body suspension bolster pivoted on said truck bolster, said suspension bolster extending transversely of the car body and having its ends in close proximity to the car body, swing hangers suspended substantially vertically from the ends of the body suspension bolster for lateral swinging movement transversely of the car body without appreciable tipping of the car body about its longitudinal axis relative to said bolster, and brackets extending downward beneath the sides of the car body outside the truck frame, said brackets being pivoted to the lower ends of the swing hangers, said hangers extending below the truck bolster, said body being coupled to the body suspension bolster by thrust transfer means which permit lateral swinging of the body on said hangers but provide for transfer of brake thrusts and draft forces between the body and the suspension bolster.

9. In combination, a car body, a truck frame and means mounting the body on the frame, providing vertical and lateral adjustment of the car body relatively to the truck frame to take care of vertical and lateral shocks, said means comprising two bolster members extending transversely of the car body, one pivotally supporting the other, the ends of the upper bolster terminating in close proximity to the car body, beams extending lengthwise of the truck and located at the sides of the truck frame, said beams carried by the truck frame, springs on said beams carrying said lower bolster member, hangers and brackets extending substantially vertically down outside the truck frame below the lower bolster member and mounting the car body for lateral swinging movement from the upper bolster member transversely of the car body with no appreciable tipping of the car body about its longitudinal axis with respect to the upper bolster member, means interposed between the body and the upper bolster member to transfer endwise draft and braking forces therebetween, and means interposed between the lower bolster member and the truck frame to transfer said braking and draft forces from the lower bolster to the truck frame, the said lower bolster supporting springs and the bracket and hanger connections being disposed at the sides of the truck frame and readily accessible.

10. A mounting for providing lateral shock absorbing movement of a car body with respect to a truck having a center plate bearing for the car body, said mounting comprising a body suspension bolster provided with a center plate bearing adapted to ride on the truck center plate bearing, said bolster extending outwardly and upwardly from its center plate bearing and its free ends terminating adjacent the side edges of the car body, brackets on the car body extending downwardly at the sides of the car body outside the truck frame, substantially vertical suspension means suspending the lower ends of said brackets directly from the ends of the body suspension bolster and cooperating with said brackets to suspend the car body from the body suspension bolster for relative horizontal movement transversely of the truck and preventing substantial vertical movement of either side of the body with respect to the body suspension bolster, and separate means to carry brake and draft thrusts between the car body and the body suspension bolster, said body and said body suspension bolster having cooperating members thereon to positively prevent excessive relative lateral movement of the car body with respect to the truck.

11. Mounting means for mounting a car body upon a truck having a center plate bearing adapted to support the car body, said mounting means comprising a body suspension bolster provided with a center plate bearing adapted to ride on the truck center plate bearing and pivot thereon, said body suspension bolster extending outwardly and upwardly from its center plate bearing beyond and above the truck and having suspension members depending from its free ends, a body bolster fixed to the car body and overlying the body suspension bolster and having a portion intermediate its ends extending downwardly in close proximity to the central portion of the body suspension bolster, means on said portions of the bolsters for limiting the endwise movement of one with respect to the other, body supporting members rigidly fixed to and depending from the body at the ends of the body bolster and connected to the lower ends of said suspension members at a point below the level of the central bearing plate of the truck.

12. Mounting means for mounting a car body upon a truck having a center plate bearing adapted to support the car body, said mounting means comprising a body suspension bolster provided with a center plate bearing adapted to ride on the truck center plate bearing and pivot thereon, said body suspension bolster extending outwardly and upwardly from its center plate bearing beyond and above the truck and having suspension members depending from its free ends, a body bolster fixed to the car body and overlying the body suspension bolster and having a portion intermediate its ends extending downwardly in close proximity to the central portion of the body suspension bolster, means on said portions of the bolsters for limiting the endwise movement of one with respect to the other, body supporting members rigidly fixed to and depending from the body at the ends of the body bolster and connected to the lower ends of said suspension members at a point below the level of the central bearing plate of the truck, said suspension members diverging downwardly at an angle below about 6° to the vertical from their connection to the body suspension bolster to their connection with the supporting members.

JAY R. SHEESLEY.